United States Patent [19]
Suetake

[11] Patent Number: 6,032,525
[45] Date of Patent: Mar. 7, 2000

[54] THERMOSENSITIVE FLOWMETER FOR DETECTING FLOW RATE OF FLUID

[75] Inventor: Naruki Suetake, Tokyo, Japan

[73] Assignee: Mitsubishi Denki Kabushiki Kaisha, Tokyo, Japan

[21] Appl. No.: 09/003,282

[22] Filed: Jan. 6, 1998

[30] Foreign Application Priority Data

Sep. 11, 1997 [JP] Japan ................................. 9-246907

[51] Int. Cl.$^7$ .................................................. G01F 1/68
[52] U.S. Cl. .................................. 73/204.15; 73/204.25
[58] Field of Search .......................... 73/204.15, 204.17, 73/204.25

[56] References Cited

U.S. PATENT DOCUMENTS

| | | | |
|---|---|---|---|
| 4,080,821 | 3/1978 | Johnston | 73/204.15 |
| 4,845,984 | 7/1989 | Hohenstatt | 73/204.15 |
| 5,237,867 | 8/1993 | Cook | 73/204.15 |

FOREIGN PATENT DOCUMENTS 55-43447   3/1980   Japan .

OTHER PUBLICATIONS

"New Sensor Technology Development and Most Appropriate Selection or Utility" Integrated Techniques Reference Collection, vol. 1, Management Development Center Publishing Department, pp. 424–425, 426, 1978.

*Primary Examiner*—Harshad Patel
*Attorney, Agent, or Firm*—Sughrue, Mion, Zinn, Macpeak & Seas, PLLC

[57] ABSTRACT

A thermosensitive flowmeter includes a first thermosensitive resistor "Rh" for detecting a flow rate of a fluid in a fluid passage 19, a second thermosensitive resistor "Rk" for detecting an atmospheric temperature in the fluid passage, a power supply 1 for supplying a current to respective thermosensitive resistors, a first control circuit 11 for controlling a first consuming current "ih" so that the heating temperature of the first thermosensitive resistor is made to a predetermined temperature, and a second control circuit 16 for controlling a second current "ik" flowing to the second thermosensitive resistor so that it is smaller than the first consuming current by a predetermined ratio. The second control circuit responds to a voltage across the first thermosensitive resistor, whereby a self-heating of the second thermosensitive resistor is reduced by reducing the consumed current, and the number of connecting terminals to the printed wiring board on the fluid passage is reduced by a simple arrangement. With this arrangement, the thermosensitive flowmeter having high accuracy and high reliability can be obtained without an increased cost.

8 Claims, 6 Drawing Sheets

PRIOR ART

PRIOR ART

PRIOR ART

THERMOSENSITIVE FLOWMETER FOR DETECTING FLOW RATE OF FLUID

BACKGROUND OF THE INVENTION

1. Field of the Invention

The present invention relates to a thermosensitive flowmeter for detecting a flow rate of a fluid using a first thermosensitive resistor for detecting the flow rate and a second thermosensitive resistor for compensating for an atmospheric temperature, and more specifically, to a thermosensitive flowmeter that realizes a cost reduction by simplifying a terminal structure, and improves reliability by suppressing the effect due to the heating of the second thermosensitive resistor.

2. Description of the Related Art

Conventionally, there are well known thermosensitive flowmeters, which use thermosensitive resistors, that are applied to, for example, the air flow sensor of an internal combustion engine in vehicles.

In general, conventional thermosensitive flowmeters that include a first thermosensitive resistor for detecting a flow rate and a second thermosensitive resistor for detecting an atmospheric temperature for temperature compensation are disposed in a fluid passage, and a bridge circuit is arranged by a plurality of elements including the first and second thermosensitive resistors.

The control circuit of the thermosensitive flowmeter sets the temperature of the first thermosensitive resistor higher than the atmospheric temperature by a predetermined temperature by supplying a heating current to the first thermosensitive resistor. Thus, the flow rate of a fluid is detected by detecting a decrease in the quantity of heat based on the increase or decrease of the heating current being supplied.

FIG. 4 is a sectional view schematically showing the structure of a conventional thermosensitive flowmeter.

In FIG. 4, the sensor unit 100 of the conventional thermosensitive flowmeter includes a thermosensitive resistor Rh which is heated to a predetermined temperature, and a second thermosensitive resistor Rk for compensating for the atmospheric temperature. The thermosensitive resistors are disposed in, for example, a fluid passage 19 containing a suction pipe of an internal combustion engine.

The first thermosensitive resistor Rh and the second thermosensitive resistor Rk of the sensor unit 100 are positioned to and held by a printed wiring board 20 that is secured to a side wall of the fluid passage 19. Additionally, terminals 21 of the respective thermosensitive resistors Rh and Rk are connected to the printed wiring board 20.

A honeycomb 23 is disposed in the fluid passage 19 at the suction side opening end thereof to make the flow rate of the fluid uniform.

The terminals 21 of the respective thermosensitive resistors Rh and Rk disposed in the fluid passage 19 are designed in a common direction and affixed to the printed wiring board 20 on the fluid passage 19 as three or four connecting terminals (shown here is a case of the four terminals).

A control circuit (which will be described later) is arranged on the printed wiring board 20 to supply power to the first and second thermosensitive resistors Rh and Rk.

FIG. 5 is a circuit diagram showing an example of a specific arrangement of the conventional thermosensitive flowmeter.

In FIG. 5, the sensor unit 100 consists of the first thermosensitive resistor Rh and the second thermosensitive resistor Rk connected in parallel to each other. A voltage VB is supplied from a vehicle-mounted power supply or a battery 1.

In this case, since the ends of the respective thermosensitive resistors Rh and Rk are commonly connected to each other, the number of terminals to be formed three.

A fixed resistor Rm for detecting the flow rate is inserted between the first thermosensitive resistor Rh and the ground. A series circuit containing a temperature compensating fixed resistor R1 and a current regulating fixed resistor Rt is inserted between the second thermosensitive resistor Rk and the ground. These fixed resistors Rm, R1 and Rt constitute the bridge circuit together with the respective thermosensitive resistors Rh and Rk.

A control circuit is inserted between the battery 1 and the sensor unit 100 to control a current "i" supplied to the sensor unit 100 and to control the currents ih and ik supplied to the first thermosensitive resistor Rh and the second thermosensitive resistor Rk (supplied currents, i.e., consumed currents).

The control circuit consists of an emitter-grounded NPN transistor 9, fixed resistors R2 and R3 connected to the emitter and the collector of the transistor 9, respectively, a PNP transistor 10 inserted between the battery 1 and the ends of the respective thermosensitive resistors Rh and Rk, and an operational amplifier 11 connected to the base of the transistor 9 for controlling the transistor 9.

The base of the transistor 10 is connected to the collector of the transistor 9 through the fixed resistor R3. The non-inverting input terminal (+) of the operational amplifier 11 is connected to the node connecting the first thermosensitive resistor Rh, fixed resistor Rm and power supply 12 of an output voltage Ei. The inverting input terminal (−) of the operational amplifier 11 is connected to the node connecting the second thermosensitive resistor Rk and fixed resistor Rt.

The power supply 12 is used to regulate the frequency characteristics of the bridge circuit and the voltage Ei of the power supply 12 is set to a very small value.

The operational amplifier 11 linearly controls the transistor 9 in response to the voltage output from the bridge circuit and controls the current "i" supplied to the sensor unit 100.

With this arrangement, the heating temperature of the first thermosensitive resistor Rh is maintained at a temperature which is higher than that of the atmospheric temperature by a predetermined temperature.

Conventional thermosensitive flowmeters suppress heating of the second thermosensitive resistor Rk to suppress the effect of heating thereof. Reference can be made to, for example, "Technical Development of New Sensors and How They are Most Properly Selected and Used", pages 424 and 426 (Publication Division of Management Development Center, General Technical Data, Upper Volume, Jul. 31, 1978).

FIG. 6 is a circuit diagram showing an example of the arrangement of the conventional thermosensitive flowmeter which is designed to suppress the heating of the second thermosensitive resistor Rk. In FIG. 6, the same components as those described above are denoted by the same numerals and the description is omitted.

In this case, the non-inverting input terminal (+) of the operational amplifier 11 is connected to the node connecting the first thermosensitive resistor Rh and fixed resistor Rm, the inverting input terminal (−) of the operational amplifier 11 is connected to the node connecting the second thermosensitive resistor Rk and fixed resistor Rt, and the output terminal of the operational amplifier 11 is connected to the respective ends of the fixed resistors R2 and R3.

Further, an operational amplifier 16 is included to suppress the heating of the second thermosensitive resistor Rk in relation to a bridge circuit.

The operational amplifier 16 constitutes a second control circuit for controlling the current ik consumed by the second thermosensitive resistor Rk.

The base of an emitter-grounded NPN transistor 15A is connected to the output terminal of the operational amplifier 16, and the node connecting the second thermosensitive resistor Rk and the collector of the transistor 15A is connected to the inverting input terminal (−) of the operational amplifier 16.

Further, voltage dividing resistors, fixed resistor R4 and fixed resistor R5, are connected to the non-inverting input terminal (+) of the operational amplifier 16.

One end of the fixed resistor R4 is connected to the node connecting the second thermosensitive resistor Rk and fixed resistor Rt, and one end of the fixed resistor R5 is grounded.

The fixed resistors R4 and R5 constitute the bridge circuit together with the first thermosensitive resistor Rh, the second thermosensitive resistor Rk, and fixed resistors Rm and Rt.

The bridge circuit, including the fixed resistors R4 and R5, maintains the heating temperature of the first thermosensitive resistor Rh to a predetermined temperature and reduces the power consumed by the second thermosensitive resistor Rk to thereby suppress the self-heating of the second thermosensitive resistor Rk.

That is, the operational amplifier 16 linearly controls the transistor 15A in response to the divided voltage of the voltage across the second thermosensitive resistor Rk.

However, according to the circuit arrangement shown in FIG. 6, since the voltage dividing fixed resistors R4 and R5 are connected across the second thermosensitive resistor Rk, the impedances (resistance values) of the fixed resistors R4 and R5 are set to large values to suppress the current ik consumed by the second thermosensitive resistor Rk.

Since the first and second thermosensitive resistors Rh and Rk correspond to the two operational amplifiers 11 and 16, the terminals of the respective thermosensitive resistors Rh and Rk are individually formed, and accordingly, the four connecting terminals 21 are required as a whole as shown in FIG. 4.

Further, conventional thermosensitive flowmeters have the voltage dividing fixed resistors R4 and R5 connected across the first thermosensitive resistor Rh to suppress the impedances of the fixed resistors R4 and R5. Reference can be made to, for example, Japanese Examined Patent Publication No. 61-16026.

FIG. 7 shows the conventional thermosensitive flowmeter arranged to suppress the impedances of fixed resistors R4 and R5. The same components as those described above are denoted by the same numerals and the description is omitted.

In this case, the bridge circuit is composed of the first thermosensitive resistor Rh, the second thermosensitive resistor Rk, and the fixed resistors Rm, Rt, R4 and R5.

The inverting input terminal (−) of the operational amplifier 11 is connected to the output terminal of the operational amplifier 16, the non-inverting input terminal (+) of the operational amplifier 11 is connected to the node where the fixed resistors R4 and R5 are connected to each other, and the output terminal of the operational amplifier 11 is connected to the base of a transistor 9.

The inverting input terminal (−) of the operational amplifier 16 is connected to the node connecting the first thermosensitive resistor Rh and the fixed resistor Rm, whereas the non-inverting input terminal (+) of the operational amplifier 16 is connected to the node connecting the second thermosensitive resistor Rk and the fixed resistor Rt.

The bridge circuit maintains the heating temperature of the first thermosensitive resistor Rh to a predetermined temperature and suppresses the self-heating of the second thermosensitive resistor Rk as described above. Further, the fixed resistors R4 and R5 for restricting the current ik consumed by the second thermosensitive resistor Rk are connected across the first thermosensitive resistor Rh to thereby reduce the effect of error due to the impedances of the fixed resistors R4 and R5.

However, according to the circuit arrangement of FIG. 7, since both the terminals of the respective thermosensitive resistors Rh and Rk are designed individually and correspond to the two operational amplifiers 11 and 16, similar to the case in FIG. 6, the four connecting terminals are needed as a whole as shown in FIG. 4.

As described above, the conventional thermosensitive flowmeters have a problem with obtaining sufficient reliability, as shown in the circuit arrangement in FIG. 5, because they are liable to be affected by the self-heating of the second thermosensitive resistor Rk.

To reduce the self-heating of the second thermosensitive resistor Rk of the circuit arrangement shown in FIG. 5, the resistance value of the second thermosensitive resistor Rk must be set greater than that of the first thermosensitive resistor Rh. Accordingly, there is a problem with the cost of the second thermosensitive resistor Rk increasing.

Thus, it is intended to reduce the effect of self-heating of the second thermosensitive resistor Rk in the circuit arrangement as shown in FIG. 6 or FIG. 7. Since the number of connecting terminals between the fluid passage 19 and the printed wiring board 20 increases and, for example, the total number of the four terminals 21 is required for both terminals of the first thermosensitive resistor Rh and both the terminals of the second thermosensitive resistor Rk (refer to FIG. 4), there is a problem that a structure becomes complex.

Further, in the circuit arrangement of FIG. 6, since the input impedance of the operational amplifier 16 must be set to a large value due to the input impedances of the fixed resistors R4 and R5, which also must be set to large values to restrict the current ik consumed by the second thermosensitive resistor Rk, there is a problem that the operational amplifier 16 becomes expensive.

An object of the present invention made to solve the above problems is to provide a thermosensitive flowmeter having high accuracy and high reliability without increasing the cost. This is accomplished by suppressing the self-heating of a second thermosensitive resistor by reducing the current consumed by the resistor, and by reducing the number of connecting terminals to a printed wiring board on a fluid passage by a simple arrangement.

SUMMARY OF THE INVENTION

A thermosensitive flowmeter according to the present invention comprises a first thermosensitive resistor disposed in a fluid passage for detecting the flow rate of the fluid in the fluid passage, a second thermosensitive resistor disposed in the fluid passage for detecting an atmospheric temperature in the fluid passage, a power supply for supplying a current to the first and second thermosensitive resistors, a first control circuit for controlling a first consuming current flowing to the first thermosensitive resistor so that a heating temperature of the first thermosensitive resistor is made to a predetermined temperature, and a second control circuit for controlling a second consuming current flowing to the second thermosensitive resistor so that the second consuming current is made smaller than the first consuming current by a predetermined ratio, wherein the second control circuit controls the second consuming current in response to a voltage across the first thermosensitive resistor and at least one terminal of both the terminals of the first and second thermosensitive resistors are commonly connected and formed to the first control circuit.

As described above, the self-heating of the second thermosensitive resistor is suppressed by reducing the current consumed by the second thermosensitive resistor based on the voltage imposed on the first thermosensitive resistor.

Further, the number of connecting terminals to a printed wiring board is reduced by commonly connecting the respective ends of the first and second thermosensitive resistors to thereby connect them in series externally on the printed wiring board.

The second control circuit of the thermosensitive flowmeter according to the present invention comprises a switching element connected in series to the second thermosensitive resistor, voltage dividing resistors connected across the first thermosensitive resistor, and an operational amplifier operating in response to the divided voltage value of the voltage dividing resistors, wherein the operational amplifier controls the switching element so that the second consuming current has a constant ratio to the first consuming current.

As described above, the self-heating of the second thermosensitive resistor is suppressed by dividing the voltage imposed on the first thermosensitive resistor to thereby reduce the current consumed by the second thermosensitive resistor based on a voltage dividing ratio.

The switching element of the thermosensitive flowmeter according to the present invention is composed of a PNP transistor, wherein the non-inverting input terminal of the operational amplifier is connected to the voltage dividing resistors, the inverting input terminal of the operational amplifier is connected to the node connecting the second thermosensitive resistor and the emitter of the transistor, and the output terminal of the operational amplifier is connected to the base of the transistor.

The switching element of the thermosensitive flowmeter according to the present invention contains an NPN transistor, wherein the inverting input terminal of the operational amplifier is connected to the voltage dividing resistors; the non-inverting input terminal of the operational amplifier is connected to the node connecting the second thermosensitive resistor and the collector of the transistor; and the output terminal of the operational amplifier is connected to the base of the transistor.

As described above, the effect of the slew rate of the operational amplifier which controls the second thermosensitive resistor is suppressed by determining a voltage ratio through the NPN transistor.

Further, the input voltage range of the operational amplifier which controls the power supplied to the second thermosensitive resistor is expanded to a ground potential so that a noise resistant property is expanded and an output dynamic range is expanded at a lesser expensive cost.

The respective ends acting as the positive pole side power supply terminals of the first and second thermosensitive resistors of the thermosensitive flowmeter according to the present invention are connected commonly, the second control circuit includes a diode having an anode connected to the non-inverting input terminal of the operational amplifier, and the cathode of the diode is connected to the positive pole side power supply terminals.

DESCRIPTION OF THE PREFERRED EMBODIMENTS

Embodiment 1

An embodiment 1 of the present invention will be described with reference to the drawings.

Figure 1:
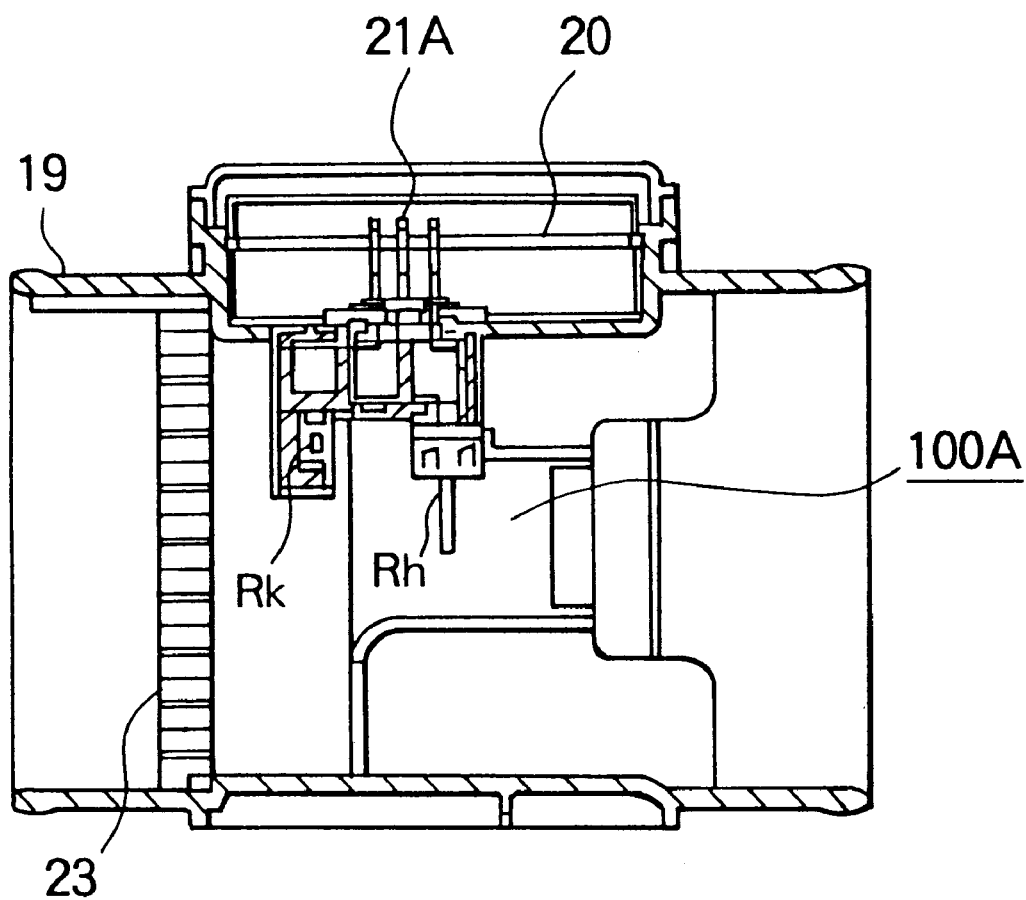
FIG. 1 is a sectional view schematically showing the structure of an embodiment 1 of the present invention.
Figure 4:
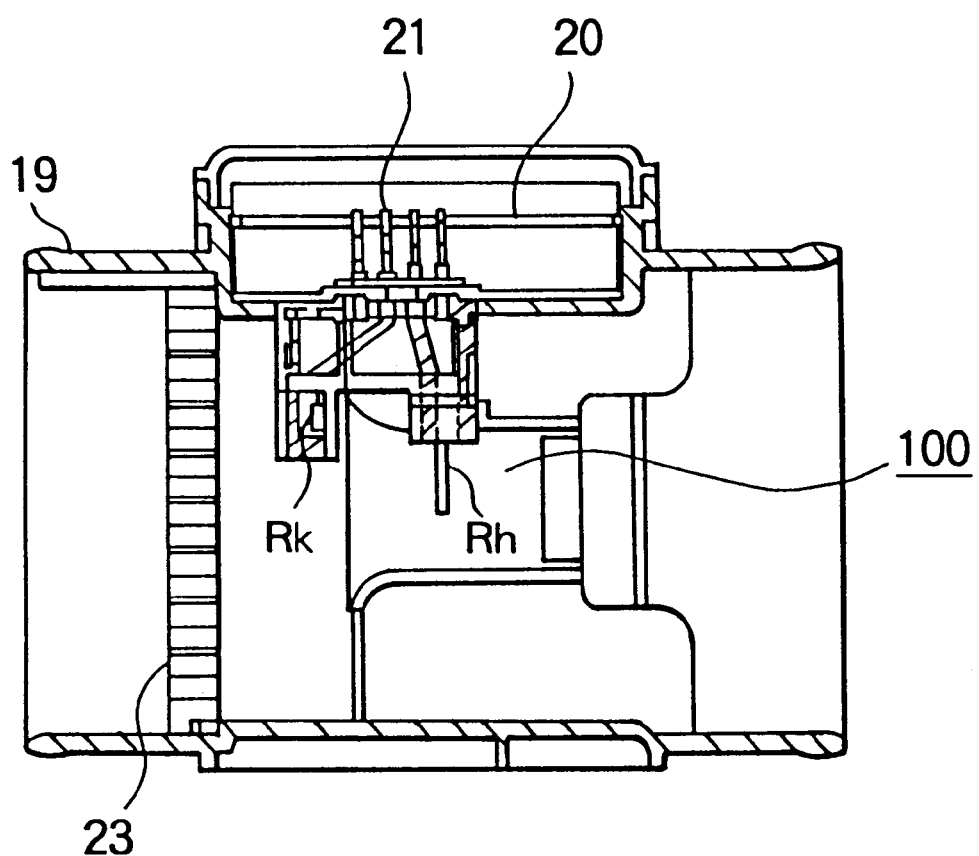
FIG. 4 is a sectional view schematically showing the structure of a conventional thermosensitive flowmeter.

FIG. 1 is a sectional view schematically showing the arrangement of embodiment 1 of the present invention, wherein the same components as those of the above mentioned (refer to FIG. 4) are denoted by the same numerals and the detailed description thereof is omitted.

In FIG. 1, the number of the terminals 21A connected from a sensor unit 100A to a printed wiring board 20 is reduced as compared with that described above, and the number of the terminals 21A is three.

Figure 2:
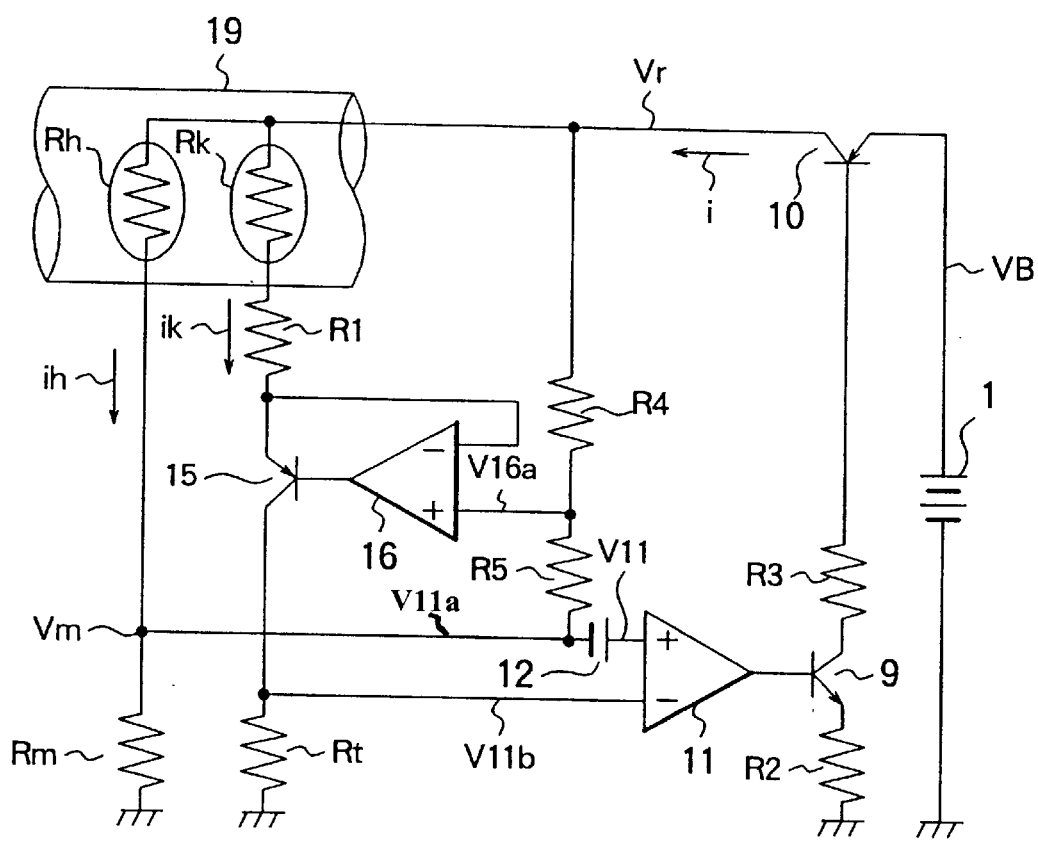
FIG. 2 is a circuit diagram specifically showing a bridge circuit according to the embodiment 1 of the present invention.
Figure 5:
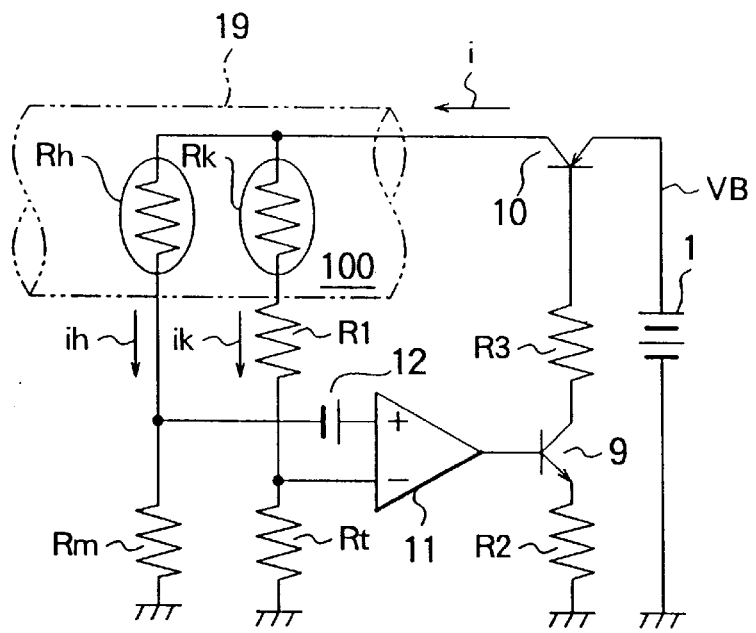
FIG. 5 is a circuit diagram specifically showing a first example of a bridge circuit according to the conventional thermosensitive flowmeter.
Figure 6:
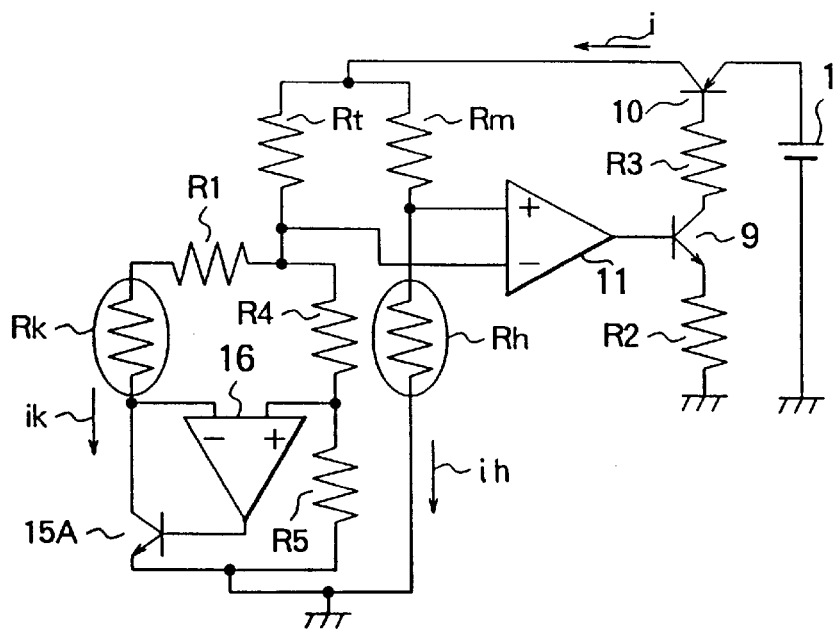
FIG. 6 is a circuit diagram specifically showing a second example of a bridge circuit according to the conventional thermosensitive flowmeter.
Figure 7:
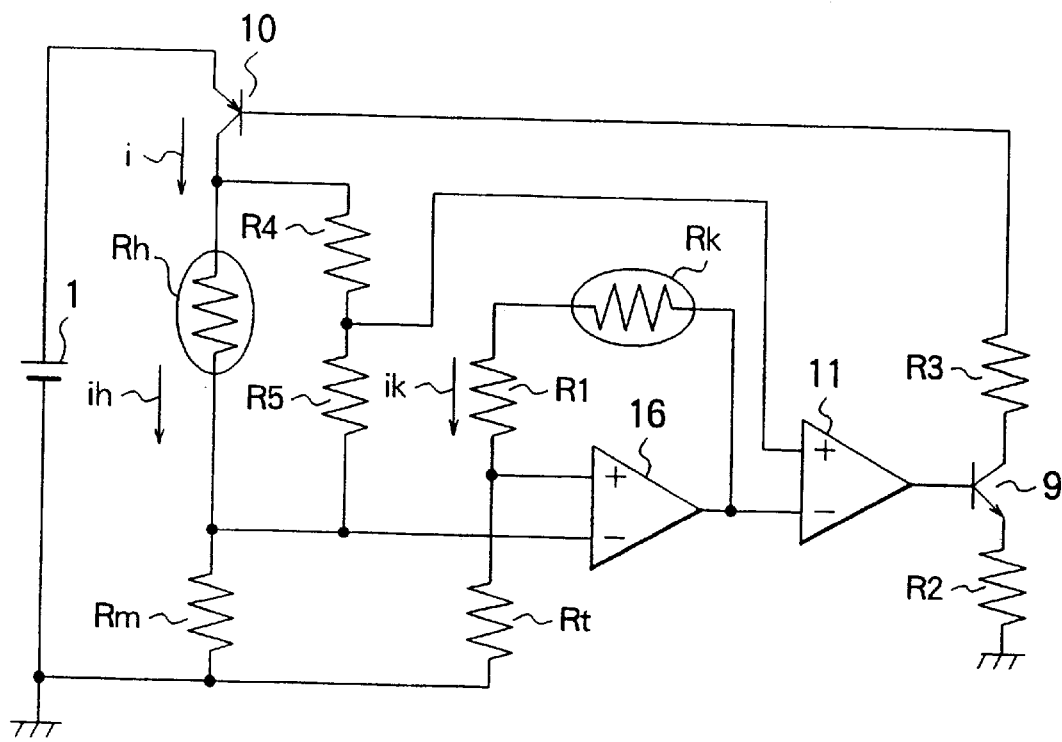
FIG. 7 is a circuit diagram specifically showing a third example of a bridge circuit according to the conventional thermosensitive flowmeter.

FIG. 2 is a circuit diagram showing an example of a specific arrangement of embodiment 1 of the present invention and the same components as those described above (refer to FIG. 5–FIG. 7) are denoted by the same numerals and the detailed description thereof is omitted.

A second thermosensitive resistor Rk and a fixed resistor Rl compensates for temperature by detecting an atmospheric temperature. Further, a fixed resistor Rt regulates the current ih supplied to a first thermosensitive resistor Rh in corresponding to operational amplifiers 11 and 16.

In FIG. 2, the operational amplifier 11 which operates in response to the voltages of the respective ends of a fixed resistor Rm and the fixed resistor Rt constitutes a first control circuit for controlling the current ih supplied to the first thermosensitive resistor Rh together with transistors 9 and 10 and fixed resistors R2 and R3.

The operational amplifier 16 which operates in response to the voltage divided by the fixed resistors R4 and R5 and the emitter voltage of a transistor 15 constitutes a second control circuit for controlling the current ik supplied to the second thermosensitive resistor Rk corresponding to the transistor 15 which is linearly controlled.

A power supply 12 having an output voltage Ei is connected to the non-inverting input terminal (+) of the operational amplifier 11, and the voltage Vm of the node connecting the first thermosensitive resistor Rh and the fixed resistor Rm is imposed on the negative pole of the power supply 12.

The collector voltage Vr of the transistor 10 is also imposed on the negative pole of the power supply 12 through the voltage dividing resistors (fixed resistors R4 and R5) for operating the operational amplifier 16 as the second control circuit.

As described later, the first thermosensitive resistor Rh is heated to a predetermined temperature by the operational amplifier 11 in response to the regulating fixed resistor Rt.

The heated first thermosensitive resistor Rh is disposed in a fluid passage 19 and the quantity of heat, which is reduced in accordance with the flow velocity of a fluid, is electrically extracted to thereby detect the flow rate of the fluid.

Next, the equilibrium condition for setting the first thermosensitive resistor Rh to the predetermined temperature in embodiment 1 of the present invention shown in FIG. 1 and FIG. 2 will be described.

In FIG. 2, the voltage V11a imposed on the non-inverting input terminal (+) of the operational amplifier 11 is expressed by the following formula (1).

$$V11a = rm \cdot Vr/(rh+rm) + Ei \approx = Vm \quad (1)$$

where rm is the resistance value of the fixed resistor Rm, Vr is the collector voltage of the transistor 10, rh is the resistance value of the first thermosensitive resistor Rh, Ei is the output voltage of the power supply 12, and Vm is the voltage across the fixed resistor Rm.

The divided voltage V16a imposed on the non-inverting input terminal (+) of the operational amplifier 16 is the voltage value divided by the fixed resistors R4 and R5 and expressed by the following formula (2).

$$V16a = (r4 \cdot Vm + r5 \cdot Vr)/(r4+r5) \quad (2)$$
$$= \{r4 \cdot rm + r5(rh+rm)\} \times Vr/\{(r4+r5) \times (rh+rm)\}$$

where r4 and r5 are the resistance values of the fixed resistors R4 and R5.

The voltage V11b imposed on the inverting input terminal (−) of the operational amplifier 11 is expressed by the following formula (3) from the formula (1) and the formula (2).

$$V11b = (Vr - V16a) \times rt/(rk+r1) \quad (3)$$
$$= \{(r4 \cdot rh)/(r4+r5) \times (rh+rm)\} \times \{rt/(rk+r1)\} \times Vr$$

The equilibrium condition of the bridge circuit is shown by the following formula (4).

$$V11a = V11b \quad (4)$$

Therefore, the formula (4) showing the equilibrium condition of the bridge circuit is expressed by the following formula (5) from the formulas (1) and (3).

$$rh = \{rm(rk+r1)/r1\} \times \{(r4+r5)/r4\} \quad (5)$$

However, it is assumed that the relationship between the voltage Ei of the power supply 12 and the voltage Vm cross the fixed resistor Rm satisfies the following formula (6).

$$Ei \ll Vm \quad (6)$$

When it is assumed that the temperature coefficient of the resistance value rh of the first thermosensitive resistor Rh is α1, the temperature coefficient of the composite resistance value (rk+r1) of the second thermosensitive resistor Rk and the fixed resistor R1 is α2, the atmospheric temperature is Ta and the temperature of the first thermosensitive resistor Rh heated by the resistance value rh is Ta+ΔT (ΔT is an amount of temperature increase), the formula (5) is modified as shown in the following formula (7).

$$rho\{1+\alpha1(Ta+\Delta T)\} = \{rm(rko+r1)/rt\} \times \{(r4+r5)/r4\} \times (1+\alpha2 \cdot Ta) \quad (7)$$

where rho is the resistance value of the first thermosensitive resistor Rh when the atmospheric temperature Ta is 0° C.

When the resistance value rt of the regulating fixed resistor Rt is adjusted based on the atmospheric temperature Ta, it is expressed by the following formula (8).

$$rt = [rm \{rk(Ta)+r1\}/rh(Ta+\Delta T)] \times (r4+r5)/r4 \quad (8)$$

At the time, the output power Prk resulting from the resistance value rk of the second thermosensitive resistor Rk is expressed by the following formula (9).

$$Prk = \{(Vr-V16a)/rk\}^2 \times rk = \{rh/(rh+rm)\}^2 \times (1/rk) \times \{r4/(r4+r5)\}^2 \quad (9)$$

As apparent from the formula (9), the output power Prk of the second thermosensitive resistor Rk is reduced by $\{r4/(r4+r5)\}^2$ as compared with that of the conventional circuit. Therefore, the effect of the second thermosensitive resistor Rk due to its self-heating can be reduced.

Further, as apparent from the formula (8), the resistance value rt of the fixed resistor Rt is increased by $\{(r4+r5)/r4\}$, thus, accuracy is improved in regulation.

Next, the temperature stability of the voltage Vm in embodiment 1 of the present invention will be described.

The relationship between the current ih of the first thermosensitive resistor Rh and a mass flow rate Qm is expressed by the following formula (10).

$$ih^2 = (Ka + Kb\sqrt{Qm}) \times \Delta T/rh \quad (10)$$

where Ka and Kb are constants.

If the voltage Vm and the constant mass flow rate Qm does not depend upon the atmospheric temperature Ta, the following formula (11) is established.

$$\partial(\Delta T/rh)/\partial Ta = 0 \quad (11)$$

The resistance value rh of the first thermosensitive resistor Rh is expressed by the following formula (12) using the heating temperature (Ta+ΔT).

$$rh = rho\{1+\alpha1(Ta+\Delta T)\} = rho\{(1+\alpha1 \cdot Ta) + \alpha1 \cdot \Delta T)\} \quad (12)$$

Therefore, the ratio of the increased temperature ΔT to the resistance value rh of the first thermosensitive resistor Rh is expressed by the following formula (13).

$$\Delta T/rh = 1/(\alpha1 \cdot rho) - (1+\alpha1 \cdot Ta)/\alpha1 \cdot rh \quad (13)$$

Further, the formula (13) can be expressed by the following formula (14) by the use of the formula (7) showing the equilibrium condition of the first thermosensitive resistor Rh.

$$\Delta T/rh = 1/(\alpha1 \cdot rho) - [rt \cdot r4/\{\alpha1 \cdot rm(rko+r1) \times (r4+r5)\} \times \{(\alpha1-\alpha2)/(1+\alpha2 \cdot Ta)\} \quad (14)$$

Therefore, the left side of the above formula (11) can be expressed by the following formula (15).

$$\partial(\Delta T/rh)/\partial Ta = -[rt \cdot r4/\{\alpha 1 \cdot rm(rko+r1) \times (r4+r5)\}] \times \{(\alpha 1-\alpha 2)/(1+\alpha 2 \cdot Ta)^2\} \qquad (15)$$

Therefore, the condition which satisfies the above formula (11) is expressed by the following formula (16).

$$\alpha 1 = \alpha 2 \qquad (16)$$

As described above, since the temperature characteristics of the bridge circuit cancels the circuit arrangement of FIG. 2, temperature stability can be obtained and the reliability of the thermosensitive flowmeter can be improved.

The error caused by the self-heating of the second thermosensitive resistor Rk can be reduced using the less expensive operational amplifier 16 as the second control circuit by dividing the voltage across the first thermosensitive resistor Rh, which depends on the current consumed by the fixed resistors R4 and R5, and by reducing the current ik consumed by the second thermosensitive resistor Rk based on the above voltage dividing ratio.

The number of terminals 21A that connect the respective thermosensitive resistors Rh and Rk to the printed wiring board 20 can be reduced to, for example, three in total by commonly connecting and designing the respective ends of the first thermosensitive resistor Rh and the second thermosensitive resistor Rk disposed in the fluid passage 19, and by connecting them to the printed wiring board 20 (refer to FIG. 1) so that reliability and processability can be improved by simplifying the structure of a terminal connecting portion.

Further, the impedances of the fixed resistors R4 and R5 can be decreased by connecting the fixed resistors R4 and R5, which relate to the control of the second thermosensitive resistor Rk across the first thermosensitive resistor Rh wherein the relatively high consuming current ih is supplied, so that the cost reduction of the operational amplifier 16 can be realized.

Embodiment 2

Figure 3:
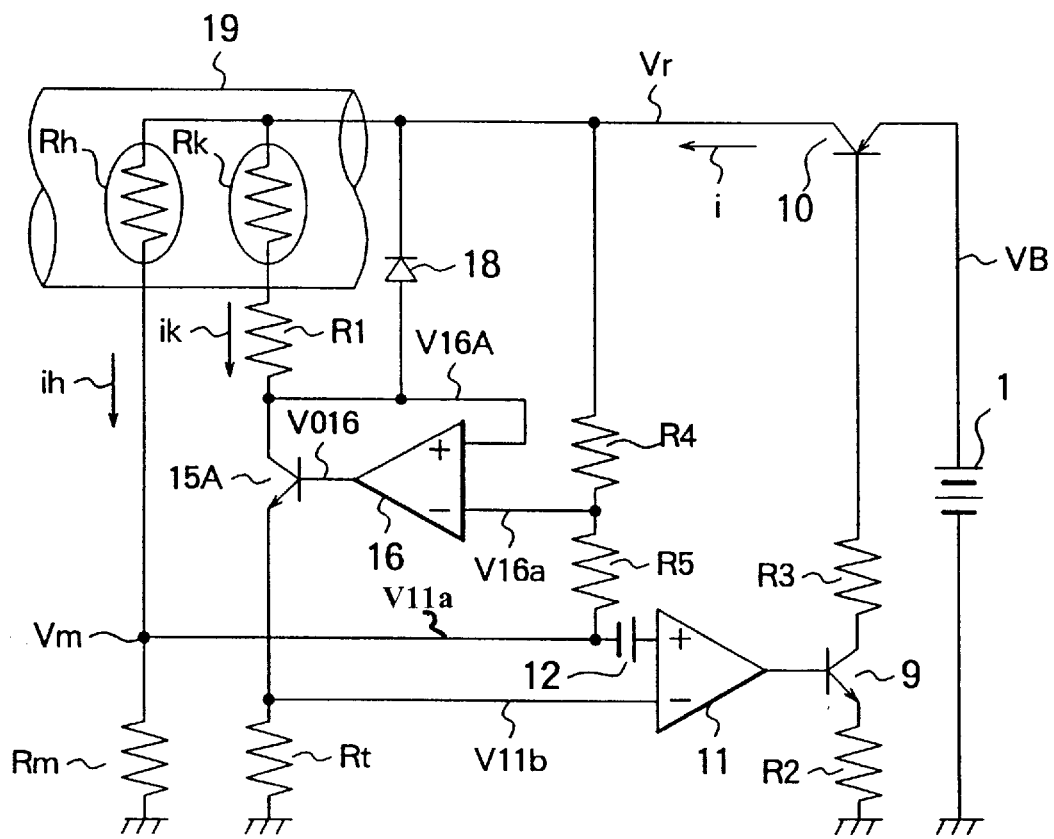
FIG. 3 is a circuit diagram specifically showing a bridge circuit according to an embodiment 2 of the present invention.

Although the PNP transistor is used as the transistor 15 connected to the second thermosensitive resistor Rk in the first embodiment, an NPN transistor 15A may be used as shown in FIG. 3.

In this case, the polarities of the input terminals (+) and (−) of the operational amplifier 16 are connected reversely to those shown in FIG. 2.

Further, a diode 18 is inserted between the collector of the transistor 15A and the respective ends of the thermosensitive resistors Rh and Rk.

Operation of the diode 18 will be described.

In FIG. 3, there are two diodes arranged between the base and the emitter of the transistor 15A and between the base and the collector thereof when viewed from the output terminal of the operational amplifier 16.

Therefore, when the output voltage V016 of the operational amplifier 16 is set to a high (H) level by the effect of noise, the base voltage (=V016) of the transistor 15A is increased and the collector voltage VC and emitter voltage VE thereof are expressed by the following formulas (17) and (18).

$$VC = V016 - VBC \qquad (17)$$

$$VE = V016 - VBE \qquad (18)$$

where VBC and VBE in the formulas (17) and (18) are the voltages between the base and the collector of the transistor 15A and between the base and the emitter thereof and have a value greater than 0.7 V.

If the diode 18 is not inserted, since the voltage V16A imposed on the non-inverting input terminal (+) of the operational amplifier 16 is higher than the collector voltage Vr of the transistor 10 as apparent from the formulas (17) and (18), the output voltage V016 of the operational amplifier 16 is always at a high level and the transistor 15A cannot be controlled.

However, the diode 18 provided to cope with the above problem makes the relationship between the voltage V16A imposed on the non-inverting input terminal (+) of the operational amplifier 16 and the collector voltage Vr of the transistor 10 shown in the following formula (19). As a result, the transistor 15A can certainly operate in an intrinsic non-saturating region.

$$V16A < Vr \qquad (19)$$

Although the voltage V11$b$ imposed on the inverting input terminal (−) of the operational amplifier 11 corresponds to the emitter potential of the transistor 15A, since the transistor 15A is the NPN transistor, the minimum value of the operational amplifier 11 can be controlled up to a ground potential (approximately zero level) by the output voltage V016 (>0 V) of the operational amplifier 16, whereby the input voltage range (control range) of the operational amplifier 11 is expanded.

When the PNP transistor 15 is used as described above (refer to FIG. 2), since the voltage V11$b$ imposed on the inverting input terminal (−) of the operational amplifier 11 is connected to the collector output voltage of the transistor 15 and the output voltage of the operational amplifier 16 cannot be made below 0 V, the minimum value of the controllable voltage V11$b$ is about 0.6 V.

Since the ratio of the current ik is determined by the voltage obtained by the NPN transistor 15A as shown in FIG. 3, the slew rate of the operational amplifier 16 is less effected, and the control range of the voltage V11$b$ imposed on the operational amplifier 11 is expanded up to the ground potential. Thus, a noise resistant property can be substantially increased and an output dynamic range can be expanded at a low cost.

What is claimed is:

1. A thermosensitive flowmeter for detecting a flow rate of a fluid comprising a first thermosensitive resistor disposed in a fluid passage for detecting said flow rate of a fluid in said fluid passage;

a second thermosensitive resistor disposed in said fluid passage for detecting an atmospheric temperature in said fluid passage;

a power supply for supplying a current to said first and second thermosensitive resistors;

a first control circuit for controlling a first consuming current flowing to said first thermosensitive resistor so that a heating temperature of said first thermosensitive resistor is made to a predetermined temperature; and a second control circuit for controlling a second consuming current flowing to said second thermosensitive resistor so that the second consuming current is made smaller than the first consuming current by a predetermined ratio, wherein said second control circuit controls the second consuming current in response to a voltage across said first thermosensitive resistor, and includes a diode for controlling said voltage, and at least one terminal of both the terminals of said first and second thermosensitive resistors are commonly connected and formed to said first control circuit.

2. A thermosensitive flowmeter according to claim 1, wherein said second control circuit comprises:

a switching element connected in series to said second thermosensitive resistor;

voltage dividing resistors connected across said first thermosensitive resistor; and an operational amplifier operating in response to the divided voltage value of said voltage dividing resistors, wherein said operational amplifier controls said switching element so that the second consuming current has a constant ratio to the first consuming current.

3. A thermosensitive flowmeter according to claim 2, wherein said switching element is a PNP transistor.

4. A thermosensitive flowmeter according to claim 3, wherein a non-inverting input terminal of said operational amplifier is connected to said voltage dividing resistors; an inverting input terminal of said operational amplifier is connected to a node connecting said second thermosensitive resistor and an emitter of said transistor; and an output terminal of said operational amplifier is connected to a base of said transistor.

5. A thermosensitive flowmeter according to claim 2, wherein said switching element is an NPN transistor.

6. A thermosensitive flowmeter according to claim 5, wherein an inverting input terminal of said operational amplifier is connected to said voltage dividing resistors; a non-inverting input terminal of said operational amplifier is connected to a node connecting said second thermosensitive resistor and a collector of said transistor; and an output terminal of said operation amplifier is connected to a base of said transistor.

7. A thermosensitive flowmeter according to claim 6, wherein respective ends, acting as positive pole power supply terminals, of said first and second thermosensitive resistors are commonly connected.

8. A thermosensitive flowmeter according to claim 7, wherein an anode of said diode is connected to said non-inverting input terminal of said operational amplifier, and a cathode of said diode is connected to said positive pole power supply terminals.

* * * * *